United States Patent
Hoyvik

(10) Patent No.: US 10,180,200 B2
(45) Date of Patent: Jan. 15, 2019

(54) METHOD OF INSTALLING AN ELECTRICALLY-HEATABLE SUBSEA FLOWLINE AND ELECTRICALLY-HEATABLE SUBSEA FLOWLINE THEREOF

(71) Applicant: Subsea 7 Norway AS, Stavanger (NO)

(72) Inventor: Eskil Hoyvik, Stavanger (NO)

(73) Assignee: Subsea 7 Norway AS, Stavanger (NO)

( * ) Notice: Subject to any disclaimer, the term of this patent is extended or adjusted under 35 U.S.C. 154(b) by 0 days.

(21) Appl. No.: 15/563,322

(22) PCT Filed: Apr. 7, 2016

(86) PCT No.: PCT/EP2016/057673
§ 371 (c)(1),
(2) Date: Sep. 29, 2017

(87) PCT Pub. No.: WO2016/162447
PCT Pub. Date: Oct. 13, 2016

(65) Prior Publication Data
US 2018/0066770 A1    Mar. 8, 2018

(30) Foreign Application Priority Data

Apr. 10, 2015 (GB) .................................. 1506134.4

(51) Int. Cl.
*F16L 1/16* (2006.01)
*F16L 53/00* (2018.01)
(Continued)

(52) U.S. Cl.
CPC .................. *F16L 1/16* (2013.01); *F16L 1/207* (2013.01); *F16L 1/235* (2013.01); *F16L 53/37* (2018.01); *F16L 53/38* (2018.01); *H02G 9/12* (2013.01)

(58) Field of Classification Search
CPC ..... F16L 1/12; F16L 1/123; F16L 1/16; F16L 1/20; F16L 53/30; F16L 53/34; F16L 53/37; F16L 53/38
See application file for complete search history.

(56) References Cited

U.S. PATENT DOCUMENTS

| 4,401,156 A | 8/1983 | Wojtecki et al. |
| 6,142,707 A | 11/2000 | Bass et al. |

(Continued)

FOREIGN PATENT DOCUMENTS

| DE | 10 2012024122 | 6/2014 |
| EP | 0 021 597 | 1/1981 |

(Continued)

*Primary Examiner* — Frederick L Lagman
(74) *Attorney, Agent, or Firm* — Levy & Grandinetti

(57) ABSTRACT

A method of installing an electrically-heatable subsea flowline includes launching the flowline with at least one electric power cable attached in piggybacked relation. After landing the flowline with the piggybacked cable on the seabed, a free end portion of the, or each, cable having a length greater than the water depth is released from the flowline. This allows a free end of the, or each, cable to be recovered to the surface to be spliced to one or more power supply conductors. After lowering the, or each, cable and the, or each, connected conductor beneath the surface, the free end portion of at least one cable is reattached to the flowline on the seabed in piggybacked relation. To perform the method, a subsea flowline assembly includes subsea-releasable fastenings spaced along the cable and the flowline to attach at least an end portion of the cable releasably to the flowline.

25 Claims, 12 Drawing Sheets

(51) Int. Cl.
*F16L 1/20* (2006.01)
*F16L 1/235* (2006.01)
*H02G 9/12* (2006.01)
*F16L 53/37* (2018.01)
*F16L 53/38* (2018.01)

(56) References Cited

U.S. PATENT DOCUMENTS

| | | | |
|---|---|---|---|
| 6,315,497 | B1 | 11/2001 | Wittman et al. |
| 6,371,693 | B1 | 4/2002 | Kopp et al. |
| 7,282,638 | B2 * | 10/2007 | Karlsen .................. F16L 53/37 |
| | | | 174/15.1 |
| 7,381,900 | B2 | 6/2008 | Bremnes et al. |
| 8,734,026 | B2 | 5/2014 | Nagengast et al. |
| 9,765,906 | B2 * | 9/2017 | Skarnes .................. F16L 3/1066 |
| 2012/0037611 | A1 * | 2/2012 | Karlsen .................. F16L 1/123 |
| | | | 219/528 |
| 2014/0007969 | A1 * | 1/2014 | Tomas .................... F16L 1/123 |
| | | | 138/103 |
| 2014/0044489 | A1 | 2/2014 | Critsinelis et al. |
| 2014/0056648 | A1 * | 2/2014 | Ahlen ....................... H02G 1/16 |
| | | | 405/184.1 |
| 2014/0061397 | A1 * | 3/2014 | Skarnes ................ F16L 3/1066 |
| | | | 248/74.1 |
| 2014/0376900 | A1 * | 12/2014 | Bjerknes ................. H05B 3/023 |
| | | | 392/480 |
| 2015/0048079 | A1 * | 2/2015 | Heggdal ................ F16L 53/004 |
| | | | 219/618 |
| 2015/0345275 | A1 * | 12/2015 | Sathananthan .......... E21B 36/00 |
| | | | 210/737 |
| 2016/0348808 | A1 * | 12/2016 | Green ....................... F16L 1/16 |
| 2017/0276267 | A1 * | 9/2017 | Green ..................... G02B 6/502 |

FOREIGN PATENT DOCUMENTS

| | | |
|---|---|---|
| EP | 1 686 301 | 8/2006 |
| EP | 2 818 024 | 8/2013 |
| EP | 2 703 702 | 3/2014 |
| GB | 2 394 522 | 4/2004 |
| GB | 2 437 161 | 10/2007 |
| GB | 2476386 | 6/2011 |
| GB | 2492838 | 1/2013 |
| GB | 2514446 | 11/2014 |
| NO | 324463 B1 | 10/2007 |
| WO | WO 98/44372 | 10/1998 |
| WO | WO 01/70564 | 9/2001 |
| WO | WO 2004/064215 | 7/2004 |
| WO | WO 2007/011230 | 1/2007 |
| WO | WO 2008/075322 A2 | 6/2008 |
| WO | WO 2011/095453 | 8/2011 |
| WO | WO 2012/076894 | 6/2012 |
| WO | WO 2012/130273 | 10/2012 |

* cited by examiner

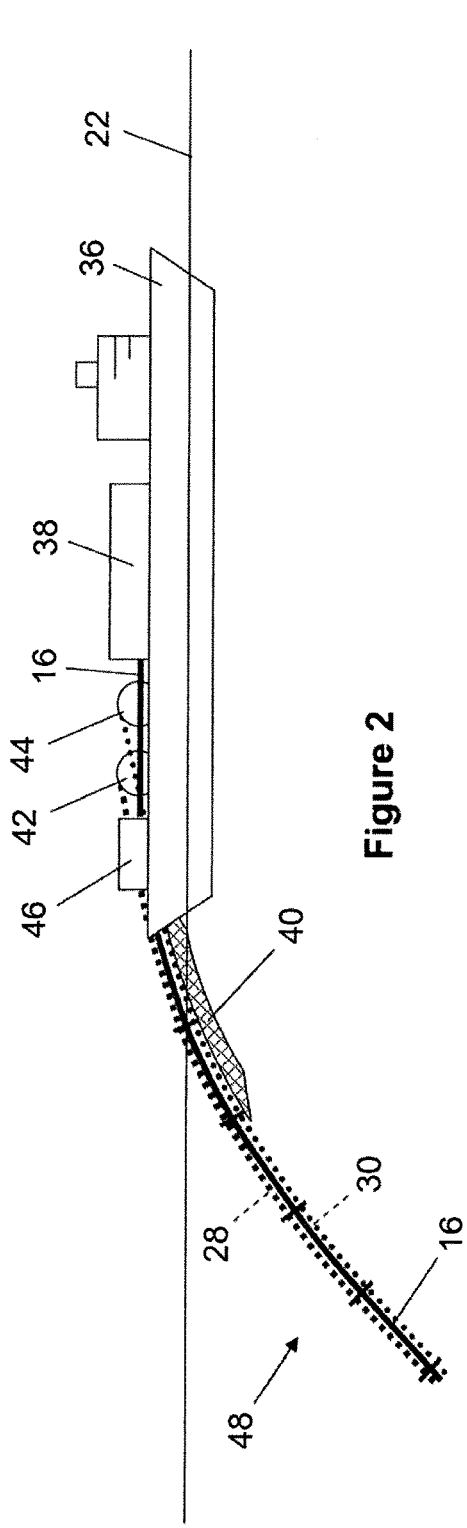
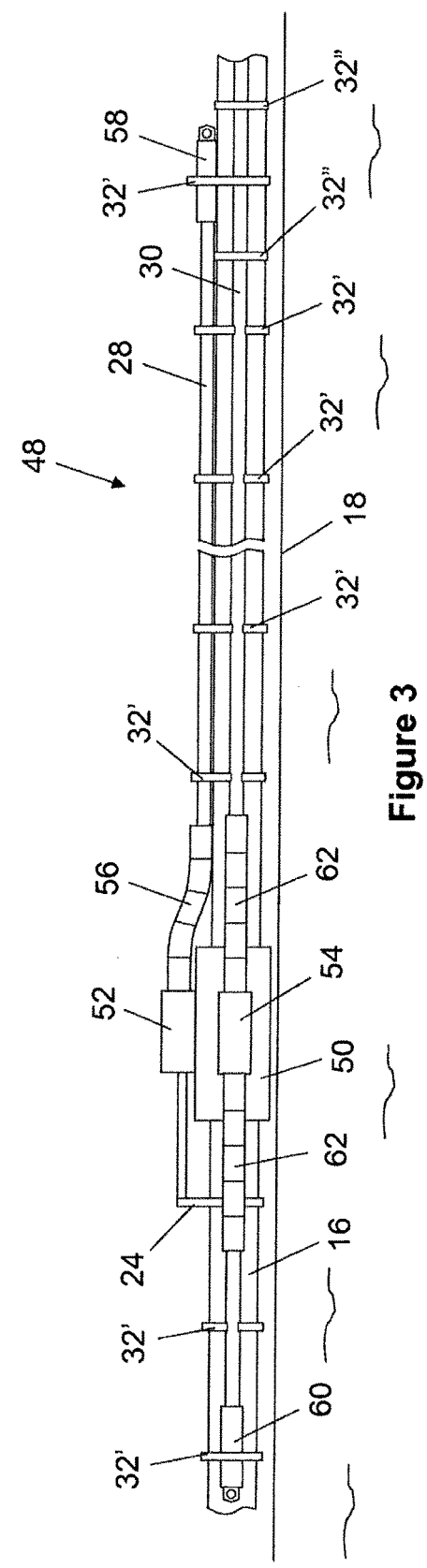

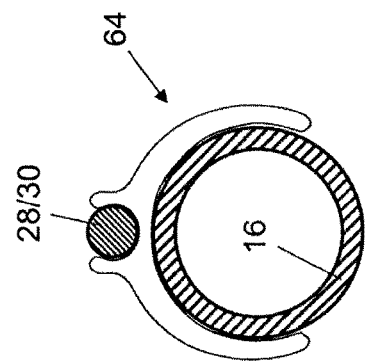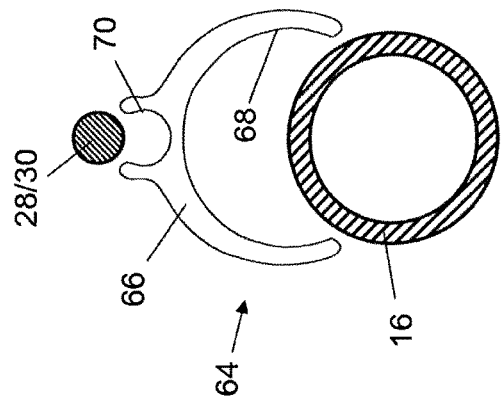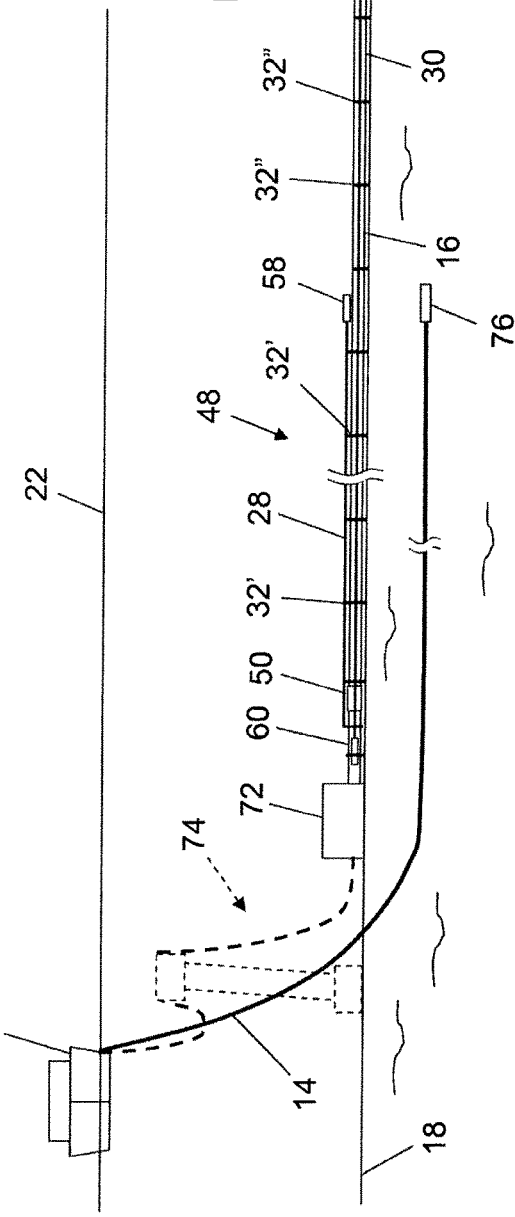

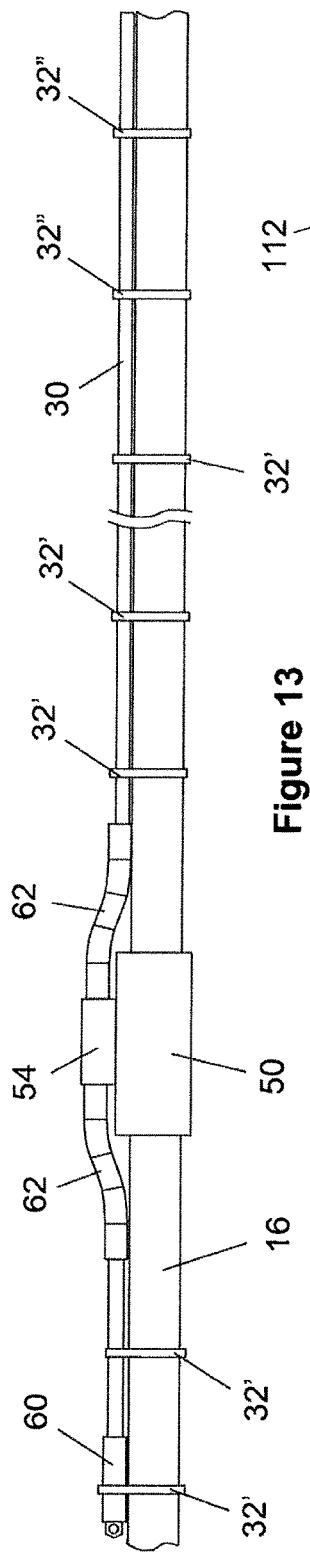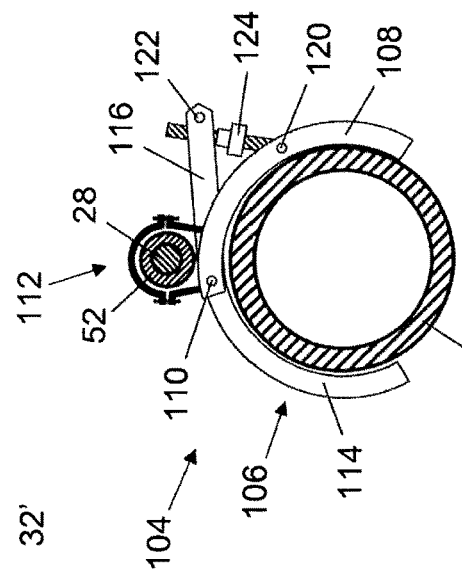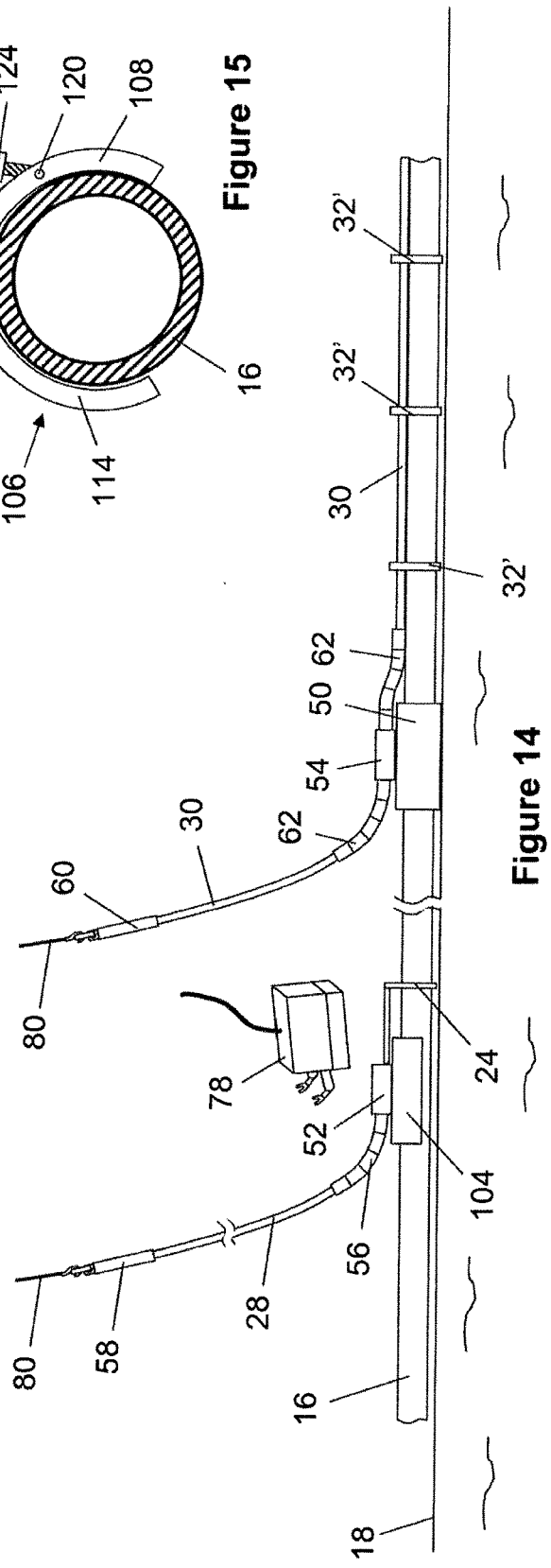

METHOD OF INSTALLING AN ELECTRICALLY-HEATABLE SUBSEA FLOWLINE AND ELECTRICALLY-HEATABLE SUBSEA FLOWLINE THEREOF

This invention relates to subsea pipelines that are heated for flow assurance. More specifically, the invention relates to the installation of subsea pipelines fitted with electrical heating systems, namely direct electrical heating systems and indirect electrical trace heating systems.

Subsea pipelines are used as 'tie-backs' to transport crude oil and/or natural gas from a subsea wellhead across the seabed on the way to the surface. Typically, in offshore locations, the oil and/or gas flows up a riser from the seabed to the surface to undergo treatment and temporary storage at a surface installation.

Oil and gas are present in subterranean formations at elevated temperature and pressure, which may be increased by the injection of fluids such as steam. On production of the oil or gas, the produced fluid emerges from the wellhead and enters a subsea pipeline in a multi-phase state.

During subsequent transportation along the pipeline, the temperature and pressure of the produced fluid have to be kept high enough to ensure a sufficient flow rate across the seabed and up the riser. In particular, various measures are taken to ensure that the internal temperature of the pipeline remains high despite thermal exchange with the surrounding seawater, which is invariably much colder.

Low temperature increases the viscosity of the produced fluid and promotes precipitation of solid-phase materials, namely waxes and asphaltenes in crude oil and hydrates in natural gas. Such solid-phase materials tend to deposit on the inner wall of the pipeline and may eventually cause plugs, which will interrupt production. Aside from the high cost of lost production, plugs are difficult and expensive to remove and can even sever the pipeline.

In addition, an oil or gas field must occasionally be shut down for maintenance. When production restarts, temperature within the pipeline must be increased quickly so that no plugs will form.

The challenges of thermal management increase as subsea pipelines become longer. In this respect, there is a trend toward longer tie-backs as oil and gas reserves are being exploited in increasingly challenging locations.

Designers of subsea pipelines have adopted both passive and active approaches to thermal management, either individually or in combination.

In passive thermal management systems, the pipeline is thermally insulated to retain heat in the pipeline. Conversely, active thermal management systems add heat to the pipeline. For example, heat may be added by thermal exchange with hot fluids flowing along or around the pipeline. In an alternative approach, heat may be added by electrical heating systems.

One example of an electrical heating system is a trace heating system comprising resistive electrical wires running along, and in thermal contact with, the outer surface of a steel flowline pipe. This is an indirect electrical heating solution because heat produced by passing an electric current along the wires is conducted firstly from the wires to the pipe wall and secondly through the pipe wall to the produced fluid flowing within the flowline.

In preferred embodiments to be described, the present invention is particularly concerned with another example of an electrical heating system, namely a direct electrical heating (DEH) system. In a DEH system, the flowline pipe itself serves as an electrically-conductive impedance that carries an alternating electric current as part of a single-phase circuit. The alternating current heats the wall of the flowline by a combination of Joule and skin effects, which in turn heats the produced fluid. The system is so named because the steel flowline wall is heated directly by the current that flows through it. The temperature of the produced fluid can therefore be controlled by varying that current.

With reference to FIG. 1 of the drawings, a DEH system 10 draws electrical power from a power supply on a surface installation 12 such as an FPSO (a floating production, storage and offloading unit) or a platform. The surface installation 12 is exemplified here as an FPSO whose moorings have been omitted for clarity. For ease of illustration, the water depth is shown greatly reduced.

WO 2007/011230 also describes an example of a DEH system.

By way of illustration, the power supply will typically be rated to provide the DEH system 10 with around 1200-1500 amps of current at a voltage drop of around 2.0-4.0kV. The challenges of handling such high currents and voltages in the subsea environment will be evident to the skilled reader.

DEH systems are very large electrical loads that may typically have a power demand of 1 MW to 10 MW depending upon the length of the flowline they are designed to heat. Power demand will also depend upon whether the pipeline is being reheated for remediation or the temperature of the produced fluid is merely being maintained.

At least one power line such as an umbilical riser 14 hangs from the surface installation 12 to connect to the DEH system 10 of a steel flowline 16 on the seabed 18 via a subsea junction box 20. In total, at least two elongate conductors extend from the surface installation 12 to the DEH system 10. In a single-core arrangement, each conductor may be placed in an individual umbilical riser. Alternatively, as shown, two or more conductors may be combined in a single umbilical riser 14 in a twin- or multi-core arrangement, in which the conductors are spaced apart by insulating spacers.

GB 2437161 describes a twin-core electric power cable for use as a riser in a DEH system.

The, or each, umbilical riser 14 has an insulating outer sheath and is armoured to resist dynamic stresses caused by wave action or tidal currents experienced in the water column between the surface 22 and the seabed 18. An umbilical riser 14 may also contain one or more fluid lines or fibre-optic cables, the former being for carrying service fluids to and from the flowline 16 and the latter being for carrying data to and from the flowline 16.

The DEH system 10 is installed on an electrically-isolated section of the flowline 16. That isolated section may be several kilometres long, potentially tens of kilometres long. The flowline 16 may, for example, be fabricated offshore on, and laid from, an installation vessel using J-lay or S-lay techniques. In those techniques, steel pipe joints are welded successively at field joints to an upper end of a pipe string extending as a catenary toward the seabed from a hang-off mechanism or tensioner system of the vessel. The welds are tested and the field joints are coated before each new section of the pipe string is launched into the sea. The flowline 16 may also be laid in reel-lay operations, in which a pipe is prefabricated from steel pipe joints at a coastal spoolbase that a reel-lay vessel visits for loading. At the spoolbase, the pipe is spooled onto a reel carried by the vessel. During subsequent pipelaying offshore, the pipe is unspooled from the reel, straightened and launched into the sea.

One of the elongate conductors in the umbilical riser 14 is connected electrically to the flowline 16 by a first connection plate 24 close to one end of the isolated section. Another of those elongate conductors is connected electrically to the flowline 16 by a second connection plate 26 close to the opposite end of the isolated section. In this way, the wall of the flowline 16 serves as a conductor to complete an electrical circuit that also contains both of the elongate conductors and the power supply of the surface installation 12.

In practical DEH systems, the physical structure of the electrical circuit is more complex. For example, it is not practical for the elongate conductors in the umbilical riser 14 to be connected directly to the respective connection points on the flowline 16. Instead, one of those conductors is connected to the first connection point 24 at a 'near end' of the flowline 16 via an intermediate feeder cable 28. The other of those conductors is connected to the second connection point 26 at the opposite, remote end of the flowline 16 via an intermediate return line or DEH cable 30 that extends along the flowline 16 from the near end to the remote end in a parallel piggybacked arrangement. The DEH cable 30 is attached to the flowline 16 by fastenings 32 spaced at intervals along the length of the flowline 16. Such fastenings 32 may comprise clamps, brackets or straps.

Piggybacking is a term of art in the subsea oil and gas industry and is well known to the skilled reader. Where elongate elements such as pipes or cables are to follow the same subsea route, it may be beneficial to install the elements simultaneously. This is commonly achieved by a piggyback technique where one or more secondary elements are attached by a succession of fastenings to a primary element on a pipelay vessel, and the elements are then launched together in parallel toward the seabed.

GB 2492838 describes a piggybacking clamp for permanently clamping two elongate pipe elements together in piggybacked relation. EP 2703702 describes a piggyback clamp for mounting a cable to a pipeline.

GB 2394522 describes a method for launching piggybacked pipelines from a vessel. Piggybacking is most commonly used for installing two or more elongate pipe elements along the same subsea route, such as a primary larger-diameter pipe for carrying hydrocarbons and a secondary smaller-diameter pipe for carrying water, gas or chemicals used to produce hydrocarbons. It is also known that a secondary piggybacked element need not be a pipe for carrying fluids but may instead be a cable for carrying power or data. The secondary piggybacked element will usually be of much smaller diameter than the primary element on which it is piggybacked.

It is not practical to insulate the DEH system 10 electrically from the surrounding seawater, not least because sacrificial anodes are generally provided on the flowline 16 for corrosion protection. Consequently, the DEH system 10 is electrically connected to the surrounding seawater by arrays 34 of additional sacrificial anodes mounted on the flowline 16. Those arrays 34 typically extend about fifty metres to either side of each connection point 24, 26 to define current transfer zones. It follows that the electrical circuit includes not just the flowline 16 but also the seawater surrounding the flowline 16 between the current transfer zones. Thus, the DEH cable 30 serves as a forward conductor while the flowline 16 and the surrounding seawater serve in parallel as a return conductor. The return current may, for example, divide in a ratio of about 70:30 between the flowline 16 and the seawater.

The umbilical riser 14 is not apt to serve as the DEH cable 30 because of its bulky cross-section and its armouring. In particular, electromagnetic issues mean that it is important to minimise the radial distance between the DEH cable 30 and the underlying flowline 16 in order to minimise power consumption. Similarly, armouring the DEH cable 30 is not desirable because any metal interposed between the DEH cable 30 and the flowline 16 will damage efficiency.

The absence of armouring on the DEH cable 30 makes it vulnerable to stretching, abrasion and crushing during and after installation. In view of this vulnerability, it is preferred to use the flowline 16 to protect the DEH cable 30 during installation from an installation vessel by launching the DEH cable 30 already attached to the flowline 16 in a parallel piggybacked arrangement. This will be explained further with reference to FIG. 2 of the drawings.

It will be evident that electrical connections have to be made in the subsea junction box 20 between the feeder cable 28, the DEH cable 30 and the respective associated conductors in the umbilical riser 14. All such connections must handle large currents and high voltages and have to be isolated from seawater to avoid unacceptable power loss.

The description above exemplifies a closed-loop system. An open-loop system is also possible in which electrical power is supplied to one end of the flowline 16 and the surrounding seawater alone serves as the return line. In that case, the DEH cable 30 may be omitted.

Another kind of closed-loop DEH system employs the outer pipe of a pipe-in-pipe (PiP) system as a return conductor instead of a DEH cable. The PiP structure also provides passive thermal management by virtue of its insulating annulus between the outer pipe and an inner pipe that serves as a flowline.

Electrical connection of the cables to the flowline and of successive sections of cables is a problem because the risk of water ingress at interfaces is high. Wet-mateable connectors or subsea connectors, such as those disclosed in U.S. Pat. No. 8,734,026, are not satisfactory for reasons of long-term reliability and because it is difficult to connect two cables on one unique umbilical.

U.S. Pat. No. 6,371,693 also describes subsea connection of electric power cables using wet-mateable connectors.

U.S. Pat. No. 7,381,900 describes a DEH cable that comprises two conductor layers, the first being a feeder layer and the second being a return layer. Thus the same umbilical provides two cable functions but this suffers the penalty of a complex cable structure that is needlessly expensive compared with simpler cables.

An example of electrical connection of DEH cable to a flowline is described in U.S. Pat. Nos. 6,315,497 and 6,142,707. In this example, the function of the return line is performed by the outer pipe of a PiP section. In the same patent family, U.S. Pat. No. 6,371,693 teaches the use of a wet-mateable electrical connector to connect the umbilical riser to the flowline. U.S. Pat. No. 6,328,583 describes another simple connector for DEH cable. As such connectors may not be reliable enough, splicing of cables remains preferred.

Electrical connection of hardware by splicing and/or welding to a conducing plate is preferred but it has to be performed in a dry environment. Generally this means that those operations have to be performed above the surface. Thus, a drawback of splicing or welding is that it makes installation of the pipeline assembly challenging, especially in deeper water. The pipeline may have to be partially recovered to the surface, or huge extra cable lengths have to be provided at great expense to allow the cables to be recovered instead. Also, subsea junction boxes containing 'U-loops' or 'U-bends' of cable have to be installed and connected to the cables. These are expensive items of equipment.

EP 0021597 and U.S. Pat. No. 4,401,156 both describe a pipe for use in a chemical refining plant. An elongate heating element is secured to the outer surface of the pipe by an apparatus extending longitudinally along the length of the pipe.

WO 98/44372 describes a method of repairing a fault in an underwater cable.

Against this background, one aspect of the invention resides in a method of installing an electrically-heatable subsea flowline on a seabed at a depth beneath a water surface. The method comprises: launching the flowline beneath the surface from a surface vessel with a first electric power cable attached to the flowline in piggybacked relation; landing the flowline and the piggybacked first electric power cable on the seabed at said depth; releasing a free end portion of the first electric power cable from the flowline on the seabed, that released free end portion having a length greater than said depth; recovering a free end of the free end portion to the surface; at the surface, electrically connecting the free end of the first electric power cable to a first electric power supply conductor, advantageously by splicing; lowering the connected first electric power cable and first electric power supply conductor beneath the surface; and reattaching the free end portion of the first electric power cable to the flowline on the seabed in piggybacked relation.

A fixed portion of the first electric power cable is preferably left attached to the flowline in piggybacked relation while recovering the free end to the surface.

While the flowline is being launched and landed, the first electric power cable is conveniently held attached to the flowline by fastenings spaced along the flowline. The free end portion of the first electric power cable may then be removed from and later reattached to fastenings that remain attached to the flowline. Alternatively, when removed from the flowline, the free end portion of the first electric power cable may remain attached to fastenings that are removed from the flowline. In that case, those fastenings may subsequently be reattached to the flowline.

After connection to the first electric power supply conductor, the free end portion of the first electric power cable may be reattached to the flowline with fastenings other than the fastenings that were used for its attachment to the flowline during launching and landing.

It is currently preferred to use temporary straps to hold the first electric power cable against the flowline for launching. After the flowline assembly has been landed on the seabed, the straps are cut to release the free end portion of the first electric power cable from the flowline. Then, retrofit clamps may be installed onto the flowline subsea in parallel with the splicing operation, for use in reattaching the free end portion to the flowline after splicing.

A fixed end of the first electric power cable is preferably electrically connected to the flowline before launching the flowline the sea.

The released free end portion of the first electric power cable is suitably laid on the seabed before recovering its free end to the surface. Similarly, the first electric power supply conductor is suitably laid on the seabed before recovering its free end to the surface. Advantageously, free ends of the first electric power cable and the first electric power supply conductor are recovered to the surface simultaneously.

The free end portion of the first electric power cable may be released from an anchor clamp attached to the flowline for recovery of the free end of the first electric power cable to the surface. In that case, the free end portion of the first electric power cable may be reattached to the anchor clamp after lowering the connected first electric power cable and first electric power supply conductor beneath the surface.

The flowline is preferably launched beneath the surface with a second electric power cable also attached to the flowline in piggybacked relation. Again, conveniently, the second electric power cable is electrically connected to the flowline before the flowline is launched into the sea. Also, the flowline may be launched with a fixed portion of the second electric power cable permanently attached to an anchor clamp attached to the flowline.

Where the flowline assembly comprises a second electric power cable, the method of the invention preferably comprises: releasing a free end portion of that cable from the flowline on the seabed, that released free end portion having a length greater than said depth; recovering a free end of the free end portion to the surface; at the surface, electrically connecting the free end of the second electric power cable to a second electric power supply conductor, advantageously by splicing; and lowering the connected second electric power cable and second electric power supply conductor beneath the surface.

Again, the released free end portion of the second electric power cable is conveniently laid on the seabed before recovering its free end to the surface. Also, the second electric power supply conductor is conveniently laid on the seabed before recovering its free end to the surface. In that case, it is preferred that the free ends of the second electric power cable and the second electric power supply conductor are recovered to the surface simultaneously.

First and second electric power supply conductors are conveniently implemented in a common umbilical riser.

A second electric power cable may be connected to the flowline after the flowline is landed on the seabed. For example, an anchor clamp may be attached to the flowline on the seabed, the anchor clamp being attached to the second electric power cable.

The inventive concept embraces an electrically-heatable subsea flowline assembly. The assembly comprises: a flowline; a first electric power cable attached to the flowline in piggybacked relation; and subsea-releasable fastenings spaced along the first electric power cable and the flowline to attach at least an end portion of the first electric power cable releasably to the flowline.

An end portion of the first electric power cable is preferably attached to the flowline by subsea-releasable fastenings spaced along the end portion. In that case, a fixed portion of the first electric power cable in longitudinal series with the end portion is preferably attached to the flowline by permanent fastenings spaced along the fixed portion.

Conveniently, the subsea-releasable fastenings may be reusable to reattach a released portion of the first electric power cable to the flowline in piggybacked relation. For example, the subsea-releasable fastenings may comprise snap-fit formations shaped to embrace the flowline and/or the first electric power cable.

An anchor clamp may be attached to the flowline, in which case the first electric power cable may be subsea-removably and subsea-replaceably attached to the anchor clamp. A fixed end of the first electric power cable opposed to the releasably-attached end portion may be is electrically connected to the flowline at a remote end connection.

When the flowline assembly of the invention is in situ on a seabed at a depth beneath a water surface, the releasably-attached end portion of the first electric power cable advantageously has a length that is greater than said depth.

The flowline assembly of the invention may further comprise a second electric power cable attached to the flowline in piggybacked relation. In that case, at least a releasably-attached end portion of the second electric power cable is preferably attached to the flowline by subsea-releasable fastenings. For example, the second electric power cable may be attached to the flowline by the same subsea-releasable fastenings that attach the first electric power cable to the flowline.

Where an anchor clamp is attached to the flowline, the second electric power cable may be permanently attached to the anchor clamp. In another approach, the second electric power cable may be attached to an anchor clamp that is attachable to to the flowline subsea. A fixed end of the second electric power cable is preferably electrically connected to the flowline at a near end connection.

Advantageously, first and second electric power cables may lie side-by-side on the flowline, with free ends of the first and second electric power cables preferably facing in opposite longitudinal directions.

Again, when the flowline assembly of the invention is in situ on a seabed at a depth beneath a water surface, a releasably-attached end portion of the second electric power cable advantageously has a length that is greater than said depth.

The inventive concept extends to a subsea installation comprising the flowline assembly of the invention. For example, the installation may comprise: a flowline extending across the seabed; a first electric power cable attached to the flowline in piggybacked relation and electrically connected to the flowline at a remote end region of the flowline; a first electric power supply conductor electrically connected to the first electric power cable, preferably by splicing; a second electric power cable electrically connected to the flowline at a near end region of the flowline opposed to the remote end region; and a second electric power supply conductor electrically connected to the second electric power cable, preferably by splicing. A subsea junction box conveniently houses the connections between the first and second electric power supply conductors and the first and second electric power cables.

In summary, the inventive concept provides a method of installing an electrically-heatable subsea flowline. The method comprises launching the flowline with at least one electric power cable attached in piggybacked relation. After landing the flowline with the piggybacked cable on the seabed, a free end portion of the, or each, cable having a length greater than the water depth is released from the flowline. This allows a free end of the, or each, cable to be recovered to the surface to be spliced there to one or more power supply conductors. After lowering the, or each, cable and the, or each, connected conductor beneath the surface, the free end portion of at least one cable is reattached to the flowline on the seabed in piggybacked relation.

To perform the method, the inventive concept also provides a subsea flowline assembly comprises subsea-releasable fastenings spaced along the, or each, cable and the flowline to attach at least an end portion of the, or each, cable releasably to the flowline.

Reference has already been made to FIG. 1 of the appended drawings, which is a schematic side view of a length of flowline fitted with a DEH system as known in the prior art. In order that the invention may be more readily understood, reference will now be made, by way of example, to the remaining drawings in which:

FIG. 2 is a schematic side view of a flowline assembly in accordance with the invention comprising a flowline with piggybacked DEH and feeder cables being launched together into the sea from an installation vessel;

FIG. 3 is an enlarged schematic side view of a near end region of the flowline assembly of FIG. 2, now landed on the seabed;

FIGS. 4a and 4b are schematic sectional views showing possible fastenings for attaching the DEH cable or the feeder cable to the flowline, FIG. 5a being an exploded view and FIG. 5b being an assembled view;

FIG. 5 is a schematic side view of the flowline assembly of FIGS. 2 and 3 in the context of a subsea riser system and a surface installation connected by the riser system to the flowline assembly, showing an umbilical riser from the surface installation laid temporarily on the seabed beside a near end region of the flowline assembly;

FIG. 13 is a schematic side view of an alternative flowline assembly of the invention, in which only a DEH cable is piggybacked to the flowline;

FIG. 14 is a schematic side view of the alternative flowline assembly of FIG. 13, showing a free end portion of the DEH cable being lifted away from the flowline for eventual splicing on a service vessel and a feeder cable having been clamped onto the flowline by an ROV; and FIG. 15 is an enlarged schematic sectional view of an ROV-operable clamp shown in FIG. 14.

For ease of understanding, FIGS. 2 to 15 use the same reference numerals as used in FIG. 1 where appropriate. The drawings are not to scale.

Figure 1:
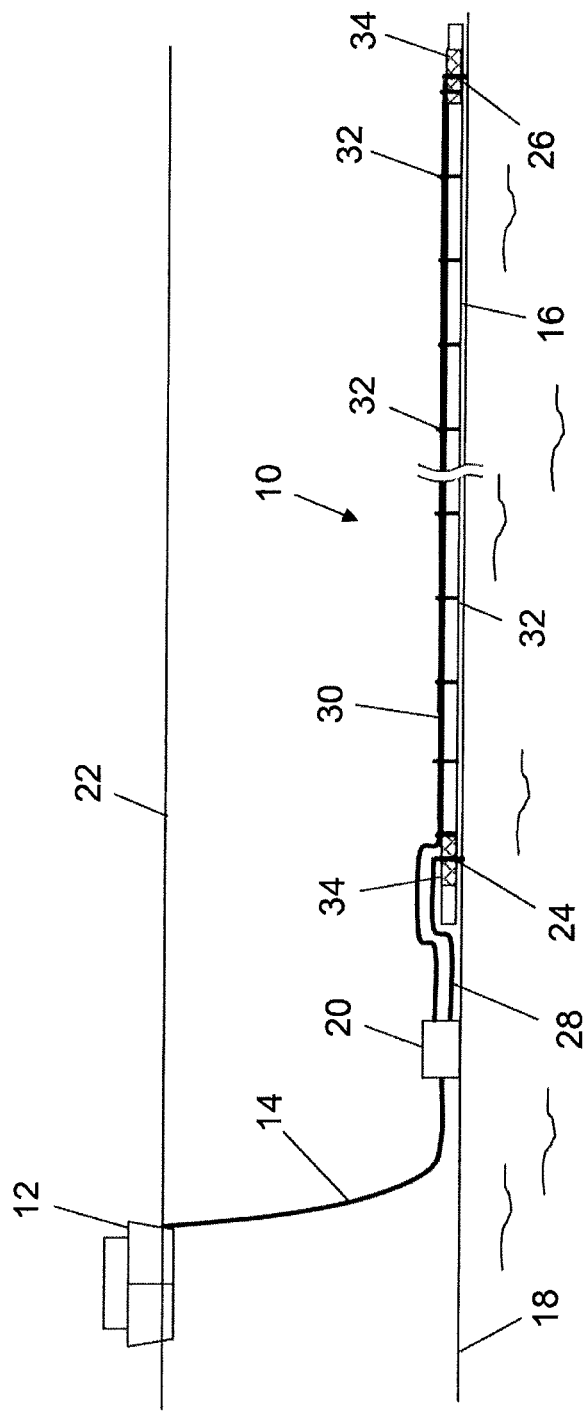

As noted previously, a flowline 16 may be fabricated offshore on, and laid from, an installation vessel using J-lay or S-lay techniques. A flowline 16 may also be laid in reel-lay operations, in which a pipe is prefabricated from steel pipe joints at a coastal spoolbase that a reel-lay vessel visits for loading.

FIG. 2 shows an S-lay operation by way of example, in which an installation vessel 36 floating on the surface 22 fabricates a flowline 16 along a firing line shown schematically at 38. Routine features of the installation vessel 36 such as tensioners have been omitted for clarity. On the firing line 38, steel pipe joints are welded successively at field joints to an upper end of the flowline 16. The welds are tested and the field joints are coated before each new section of the flowline 16 is launched into the sea over a stinger 40 extending beneath the surface 22.

In accordance with this embodiment of the invention, a feeder cable 28 and a DEH cable 30 stored on respective reels 42, 44 of the installation vessel 36 are paid out from the reels 42, 44 to match the laying rate of the flowline 16. At a piggybacking station 46 downstream of the firing line 38, the feeder cable 28 and the DEH cable 30 are brought into parallel alignment with the flowline 16 and are attached to the flowline 16 at intervals by fastenings 32 such as straps, brackets or clamps. The resulting flowline assembly 48 comprising the flowline 16 and the then-piggybacked feeder cable 28 and DEH cable 30 is then launched over the stinger 40 into the sea.

Accessories may be added to the flowline assembly 48 on the installation vessel 36, as required, to be launched with the flowline assembly 48 into the sea. Accessories may be placed at the ends of the flowline 16, exemplified by flowline end terminations (FLETs). Other accessories may be positioned in-line between the ends of the flowline 16, such as in-line tees (ILTs).

FIG. 3 shows a near end region of the flowline assembly 48 in more detail. Here, the flowline assembly 48 is shown landed on the seabed 18 at an installation site. The feeder cable 28 and the DEH cable 30 are shown extending in parallel piggybacked relation along the flowline 16, to which they are attached at longitudinal intervals by fastenings 32', 32".

Fastenings 32' are temporary fastenings, for example being releasable from and optionally reattachable to, or being removable from and optionally replaceable onto, the flowline 16, the feeder cable 28 and/or the DEH cable 30 subsea. In contrast, fastenings 32" are permanent fastenings that, once placed, keep an anchored portion of the DEH cable 30 attached to the flowline 16 in piggybacked relation. The purpose of the temporary fastenings 32' and the permanent fastenings 32" will be explained below.

In this embodiment, a tubular anchor clamp 50 encircles the flowline 16. The feeder cable 28 and the DEH cable 30 extend longitudinally around the outside of the anchor clamp 50, where they are surrounded and protected by respective armour blocks 52, 54 in longitudinal alignment with the anchor clamp 50.

The feeder cable 28 is electrically connected to the flowline 16 by a first connection plate 24 in the near end region, positioned close to the anchor clamp 50. The first connection plate 24 is conveniently welded to the flowline 16 above the surface during installation, on the firing line 38 of the installation vessel 36. There, the armour block 52 surrounding the feeder cable 28 is also permanently attached to the anchor clamp 50.

Thus anchored to the flowline 16 via the armour block 52 and the anchor clamp 50, the feeder cable 28 extends along the flowline 16 via a bend restrictor 56 adjoining the armour block 52 to terminate in a pulling head 58 at a free end of the feeder cable 28. This free end portion of the feeder cable 28 is held against the flowline 16 only by the temporary fastenings 32'. The length of the feeder cable 28 between the anchor clamp 50 and the pulling head 58 is substantially greater than the water depth between the surface 22 and the seabed 18 at the installation site.

The DEH cable 30 also has a pulling head 60 at its free end, which faces in the opposite longitudinal direction with respect to pulling head 58 at the free end of the feeder cable 28. The pulling head 60 is relatively close to the armour block 54 on the DEH cable 30. The armour block 54 of the DEH cable 30 is temporarily and releasably attached to the anchor clamp 50, for example by subsea-operable bolts or other fixings. Bend restrictors 62 surrounding the DEH cable 30 adjoin the armour block 54.

The DEH cable 30 is electrically connected to the flowline 16 by a second connection plate, but this is at a remote end region of the flowline assembly 48 potentially several kilometres away from the near end and so is not visible in FIG. 3. Again, the second connection plate is conveniently welded to the flowline 16 above the surface during installation, on the firing line 38 of the installation vessel 36.

A free end portion of the DEH cable 30 is held against the flowline 16 by the temporary fastenings 32' that also hold the feeder cable 28. Conversely, the anchored portion of the DEH cable 30 extending beyond the pulling head 58 of the feeder cable 28 is held against the flowline 16 by the permanent fastenings 32".

The purpose of the temporary fastenings 32' is that free end or distal portions of the feeder cable 28 and the DEH cable 30 may be released and lifted away from the flowline 16 subsea, and that the free end portion of at least the DEH cable 30 may subsequently be reattached to the flowline 16 in piggybacked relation subsea. The purpose of the permanent fastenings 32" is that at least the anchored or proximal portion of the DEH cable 30 remains attached to the flowline 16.

The temporary fastenings 32' are shown in FIG. 3 as holding both the feeder cable 28 and the DEH cable 30 onto the flowline 16. Thus, removing, releasing or cutting the temporary fastenings 32' subsea, for example by diver or ROV (remotely-operated vehicle) intervention depending upon the water depth, frees the free end portions of both the feeder cable 28 and the DEH cable 30 from the flowline 16 for splicing operations as will be explained. Alternatively, diver or ROV intervention may be used to pull the free end portions of the feeder cable 28 and the DEH cable 30 out of engagement with temporary fastenings 32' that remain attached to the flowline 16.

The permanent fastenings 32" are shown as holding only the anchored portion of the DEH cable 30 onto the flowline 16. As will be explained later with reference to FIGS. 11 and 12, the free end portion of the DEH cable 30 is subsequently reattached to the flowline 16 subsea, for example by diver or ROV intervention. Reattachment may be effected by reusing the temporary fastenings 32', that is, by reattaching the DEH cable 30 to temporary fastenings 32' that remain attached to the flowline 16. Reattachment may instead be effected by making new permanent fastenings 32", for example by strapping the DEH cable 30 onto the flowline 16 subsea.

It is not essential that a temporary fastening 32' holds both the feeder cable 28 and the DEH cable 30 against the flowline 16. For example, one set of temporary fastenings 32' may hold the feeder cable 28 and another set of temporary fastenings 32' may hold the DEH cable 30.

FIGS. 4a and 4b show a bracket 64 moulded from a resilient plastics material such as polypropylene or polyurethane. In principle, the bracket 64 may serve as a temporary fastening 32' or as a permanent fastening 32". The bracket 64 comprises an integral body 66 that is shaped to define part-circular female socket formations 68, 70. The socket formations 68, 70 are a major socket formation 68 whose inner radius of curvature is selected to fit around the flowline 16 and a minor socket formation 70 whose inner radius of curvature is selected to fit around the feeder cable 28 or the DEH cable 30.

The shape and resilience of the socket formations 68, 70 of the bracket 64 are such that the major socket formation 68 may be snap-fitted onto the flowline 16 and the feeder cable 28 or the DEH cable 30 may be snap-fitted into the minor socket formation 70. The feeder cable 28 or the DEH cable 30 may be pulled out of the minor socket formation 70 after the flowline assembly 48 is landed on the seabed. The DEH cable 30 may subsequently be re-fitted into the minor socket formation 70.

It will be evident to the skilled reader how the bracket 64 could be adapted to provide two minor socket formations 70 so that a single bracket 64 can hold both the feeder cable 28 and the DEH cable 30 against the flowline 16.

Turning next to FIG. 5 of the drawings, this shows the near end region of the flowline assembly 48 on the seabed 18 connected via a FLET 72 to a subsea riser system 74 shown schematically in dashed lines. The riser system 74 carries produced fluid from the flowline assembly 48 to a surface installation 12 exemplified here by an FPSO, whose moorings have again been omitted for clarity. The riser system 72 is exemplified here as a buoyancy-supported riser (BSR) system but could take other forms such as a hybrid riser tower (HRT). Again, for ease of illustration, the water depth between the surface 22 and the seabed 18 is shown greatly reduced.

An umbilical riser 14 is shown in FIG. 5 hanging from the surface installation 12 with its free end portion laid temporarily on the seabed 18 beside the near end region of the flowline assembly 48. The free end portion of the umbilical riser 14 may be laid on the seabed 18 before or after the flowline assembly 48 is laid on the seabed 18. The umbilical riser 14 terminates in a pulling head 76 at its free end.

Figure 6:
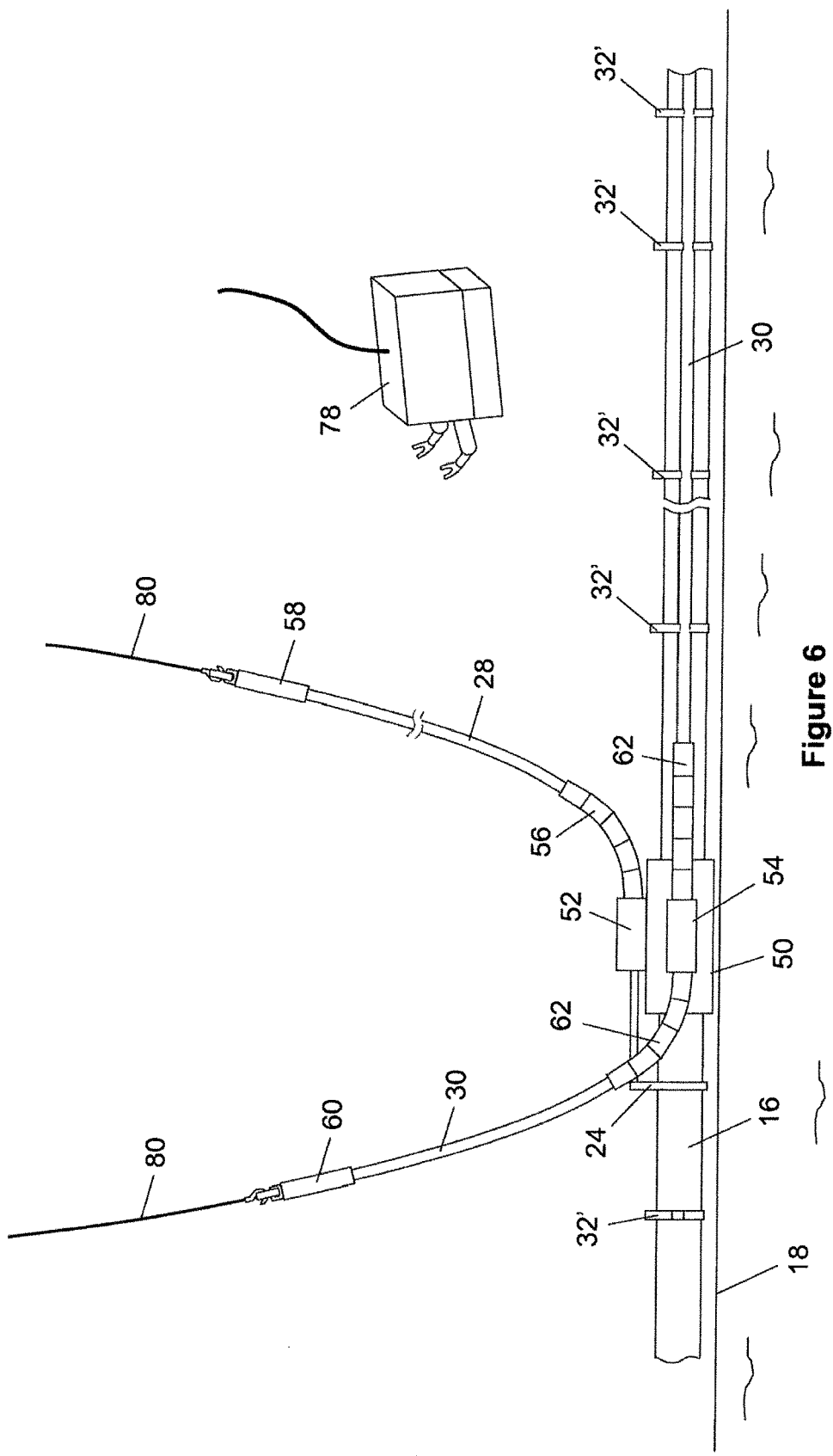
FIG. 6 is a schematic side view of the near end region of the flowline assembly corresponding to FIG. 3, but now showing free end portions of the DEH cable and the feeder cable detached from the flowline and being lifted away from piggybacked relation with the flowline to be laid temporarily on the seabed beside the umbilical riser.

The flowline assembly 48 is now ready for a splicing operation to begin. The first step of the splicing operation shown in FIG. 6 is to release the feeder cable 28 and the DEH cable 30 from the temporary fastenings 32' on the flowline 16. FIG. 6 shows an ROV 78 that has freed the feeder cable 28 from the temporary fastenings 32'. The ROV 78 has also attached a lifting wire 80 from a service vessel on the surface, not shown, to the pulling head 58 of the feeder cable 28. The lifting wire 80 has lifted the free end portion of the feeder cable 28 away from the flowline 16 so that its pulling head 58 can be laid temporarily on the seabed 18 beside the pulling head 76 of the umbilical riser 14. The bend restrictor 56 protects the proximal end of the feeder cable 28 as it bends relative to the armour block 52 that attaches the feeder cable 28 to the anchor clamp 50.

Subsequently, or previously, the ROV 78 may couple the lifting wire 80 to the pulling head 60 of the DEH cable 30 so that it can also be laid temporarily on the seabed 18 beside the pulling head 76 of the umbilical riser 14. FIG. 6 shows the free end portion of the DEH cable 30 freed by the ROV 78 from one of the temporary fastenings 32' and being lifted clear of the flowline 16. The ROV 78 is about to release the armour block 54 of the DEH cable 30 from the anchor clamp 50 and to release the DEH cable 30 from the other temporary fastenings 32'. The band restrictors 62 adjoining the armour block 54 protect the DEH cable 30 as it bends.

Figure 7:
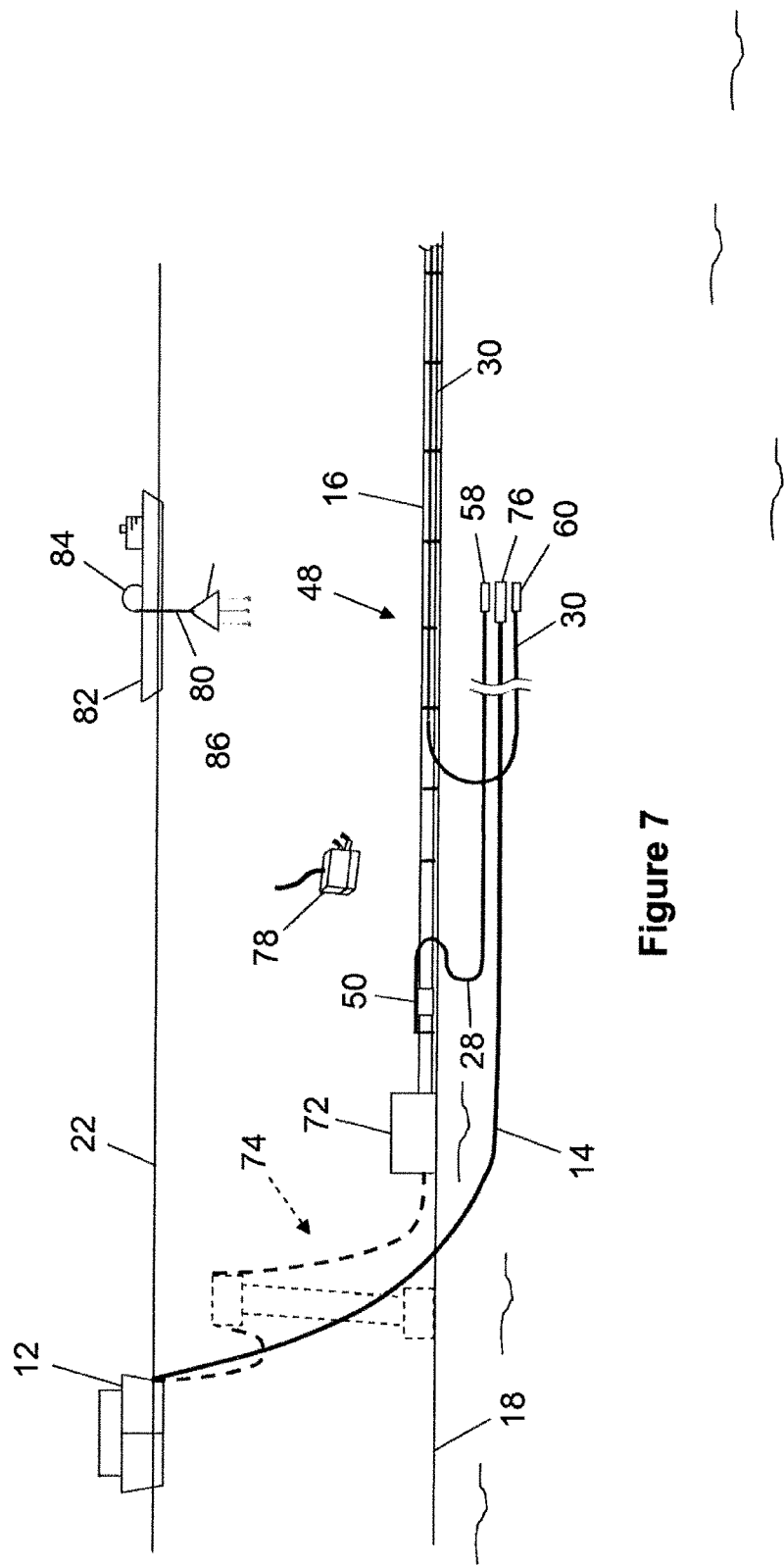
FIG. 7 is a schematic side view of the flowline assembly, subsea riser system and surface installation corresponding to FIG. 5, but now showing the DEH cable and the feeder cable laid on the seabed beside the umbilical riser.

FIG. 7 shows the pulling heads 58, 60 of the feeder cable 28 and the DEH cable 30 respectively laid on the seabed 18 beside the pulling head 76 of the umbilical riser 14. The umbilical riser 14, the feeder cable 28 and the DEH cable 30 lie generally parallel to each other over a length that exceeds the water depth.

FIG. 7 also shows a service vessel 82 on the surface 22 above the pulling heads 58, 60, 76. The service vessel 82 has a winch 84 from which a lifting plate 86 is suspended by a lifting wire 80. The winch 84 lowers the lifting plate 86 to the seabed 18 to be connected to the pulling heads 58, 60, 76 by the ROV 78. A crane on the service vessel 82 could be used instead of the winch 84 to perform this operation.

Figure 8:
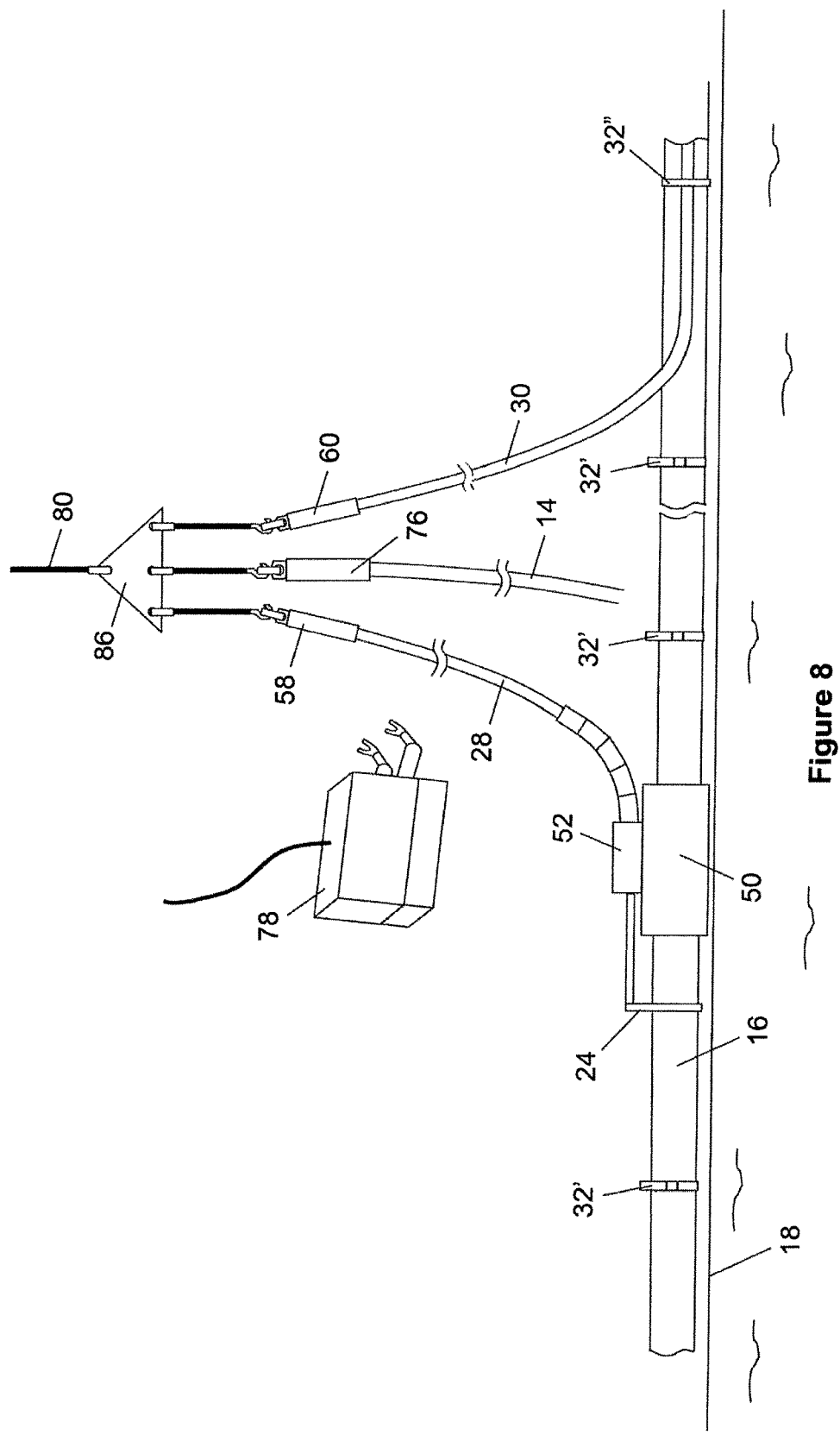
FIG. 8 is a schematic side view of the near end region of the flowline assembly corresponding to FIGS. 3 and 6, but now showing the free end portions of the DEH cable and the feeder cable being lifted away from the seabed in parallel with a free end portion of the umbilical riser.
Figure 9:
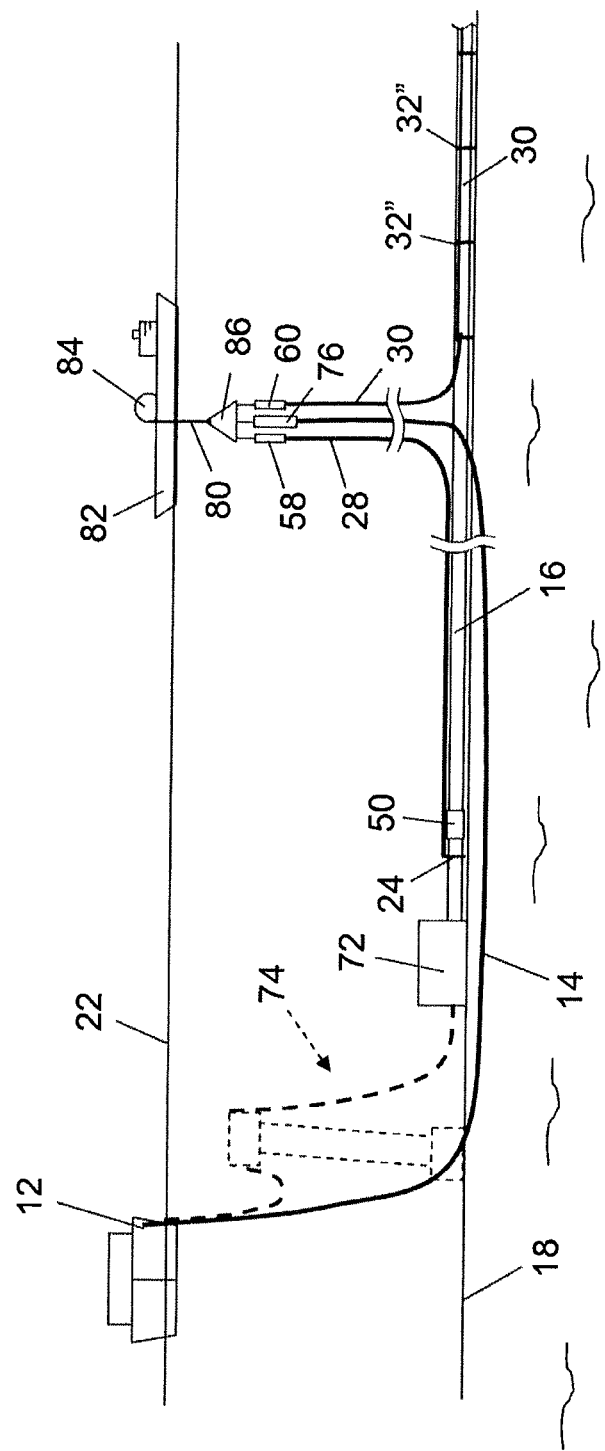
FIG. 9 is a schematic side view corresponding to FIGS. 5 and 7, now showing the free end portions of the DEH cable, the feeder cable and the umbilical riser being lifted toward a service vessel on which splicing operations will be performed.

FIGS. 8 and 9 show the pulling heads 58, 60, 76 of the feeder cable 28, the DEH cable 30 and the umbilical riser 14 coupled by the ROV 78 to the lifting plate 86 and being lifted in parallel away from the seabed 18 by the lifting wire 80. The proximal end of the feeder cable 28 remains attached to the flowline 16 via the armour block 52, the anchor clamp 50 and the first connection plate 24. An anchored proximal portion of the DEH cable 30 remains attached to the flowline 16 in piggybacked relation by permanent fastenings 32".

Figure 10A:
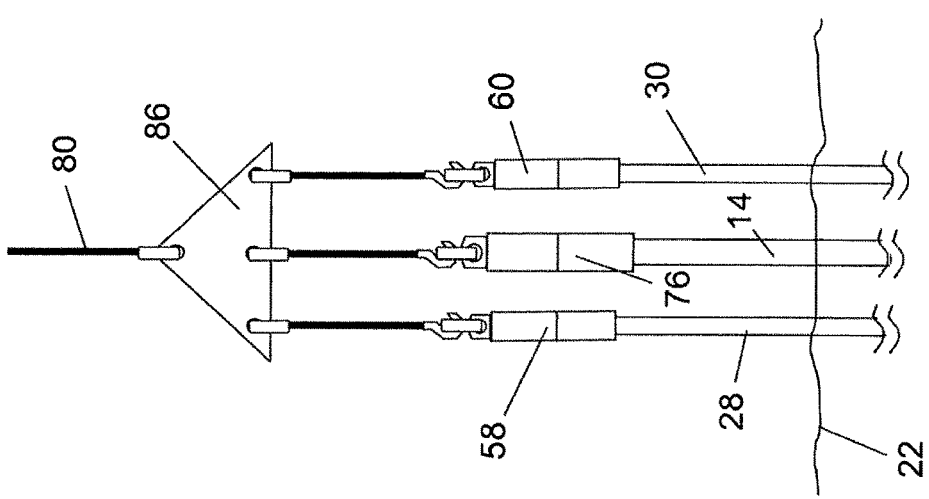
FIGS. 10a to 10f are a sequence of schematic side views showing the DEH cable, the feeder cable and the umbilical riser undergoing splicing operations on board the service vessel and the spliced connections being encased in a subsea junction box.
Figure 10B:
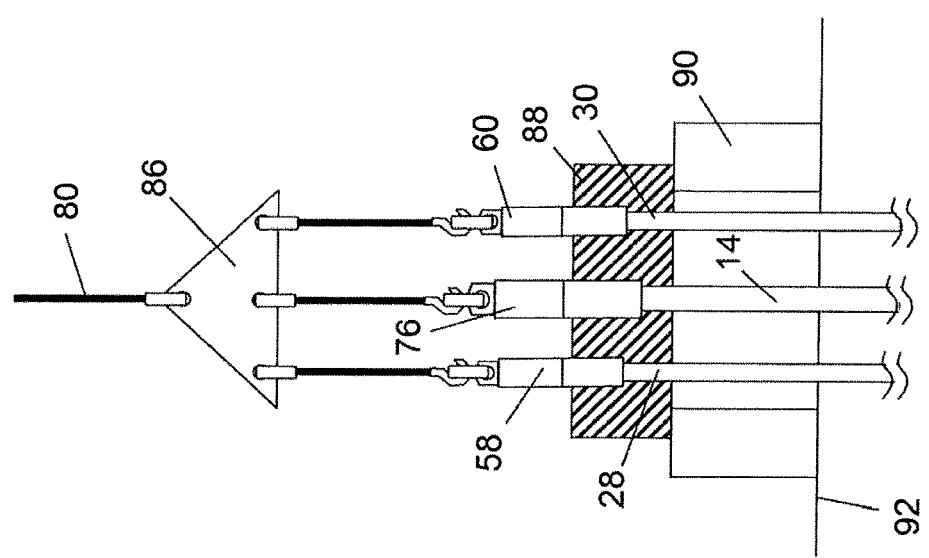

Moving on now to the sequence of schematic views shown in FIGS. 10a to 10f, the umbilical riser 14, the feeder cable 28 and the DEH cable 30 are shown in FIGS. 10a and 10b hanging in parallel from their respective pulling heads 76, 58, 60 coupled to the lifting plate 86. FIG. 10a shows the pulling heads 76, 58, 60 breaking the surface 22 whereas FIG. 10b shows the pulling heads 76, 58, 60 seated into respective sockets in a hang-off beam 88, which is supported by a hang-off structure 90 on a working deck 92 of the service vessel 82.

Figure 10C:
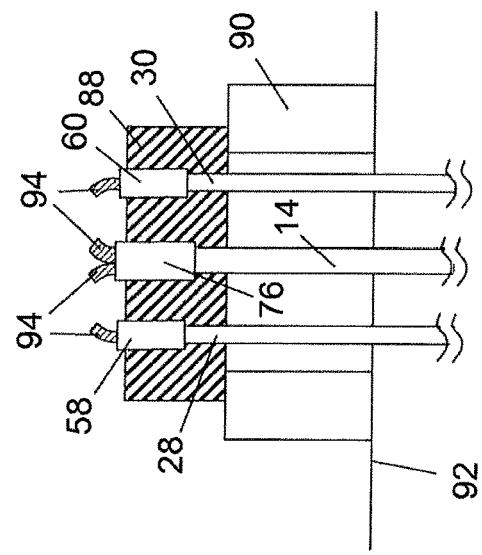
Figure 10F:
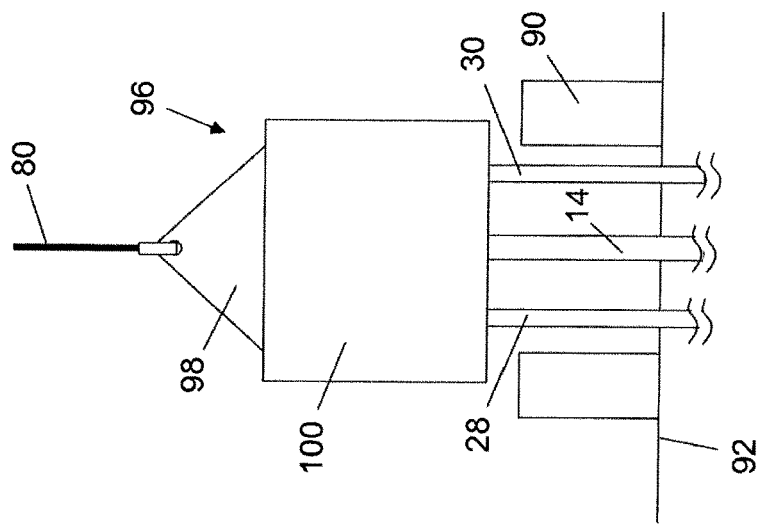

Once the pulling heads 76, 58, 60 are supported by the hang-off beam 88, they are uncoupled from the lifting plate 86 and their top portions are removed to expose the conductors 94 within, as shown in FIG. 10c. It will be noted that the umbilical riser 14 contains two conductors 94 and that the feeder cable 28 and the DEH cable 30 each contain one conductor 94. The conductors 94 are now ready to be spliced together as shown in FIG. 10d, with one conductor 94 of the umbilical riser 14 being connected to the conductor 94 of the feeder cable 28 and the other conductor 94 of the umbilical riser 14 being connected to the conductor 94 of the DEH cable 30.

Figure 10E:
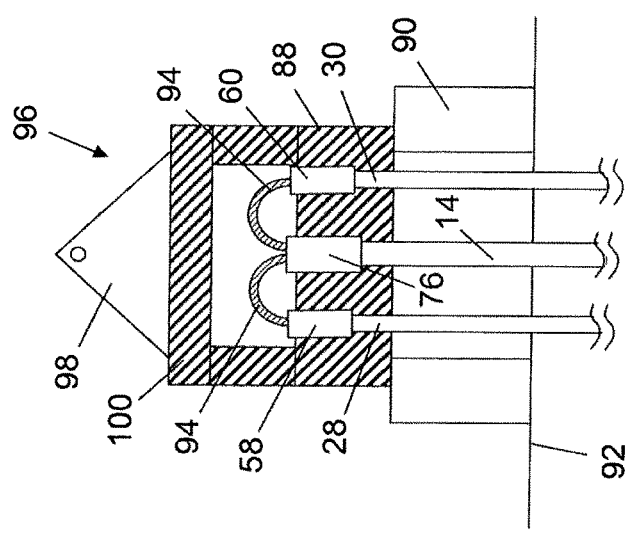
Figure 10D:
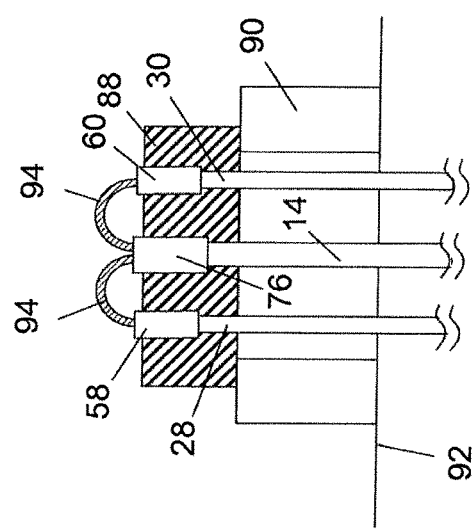

Next, a subsea junction box 96 is assembled on the hang-off beam 88 and around the spliced conductors 94 as shown in FIG. 10e. The junction box 96 comprises a lifting plate 98 atop a junction box structure 100 whereby a lifting wire 80 can lift the junction box 96 clear of the hang-off structure 90 as shown in FIG. 10f. The junction box structure 100 is therefore capable of transmitting the weight load of the umbilical riser 14, the feeder cable 28 and the DEH cable 30 from the hang-off beam 88 to the lifting plate 98.

If necessary, a feeder cable may be spliced to the recovered DEH cable 30 to extend the DEH cable 30, making it long enough to reach the junction box 96 when the junction box 96 is subsequently lowered to the seabed 18.

Figure 11:
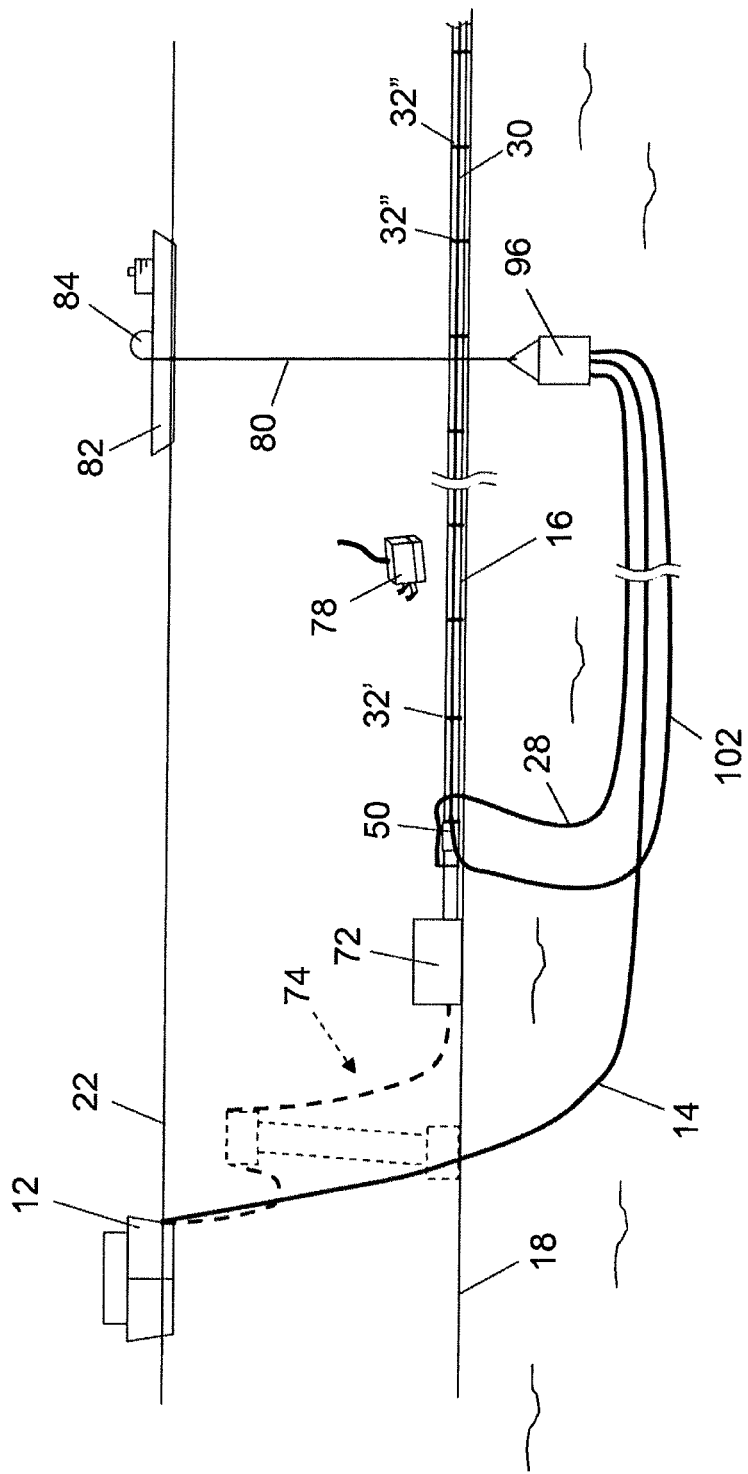
FIG. 11 is a schematic side view corresponding to FIGS. 5, 7 and 9, now showing the free end portions of the DEH cable, the feeder cable and the umbilical riser lowered back to the seabed and now joined by the subsea junction box.
Figure 12:
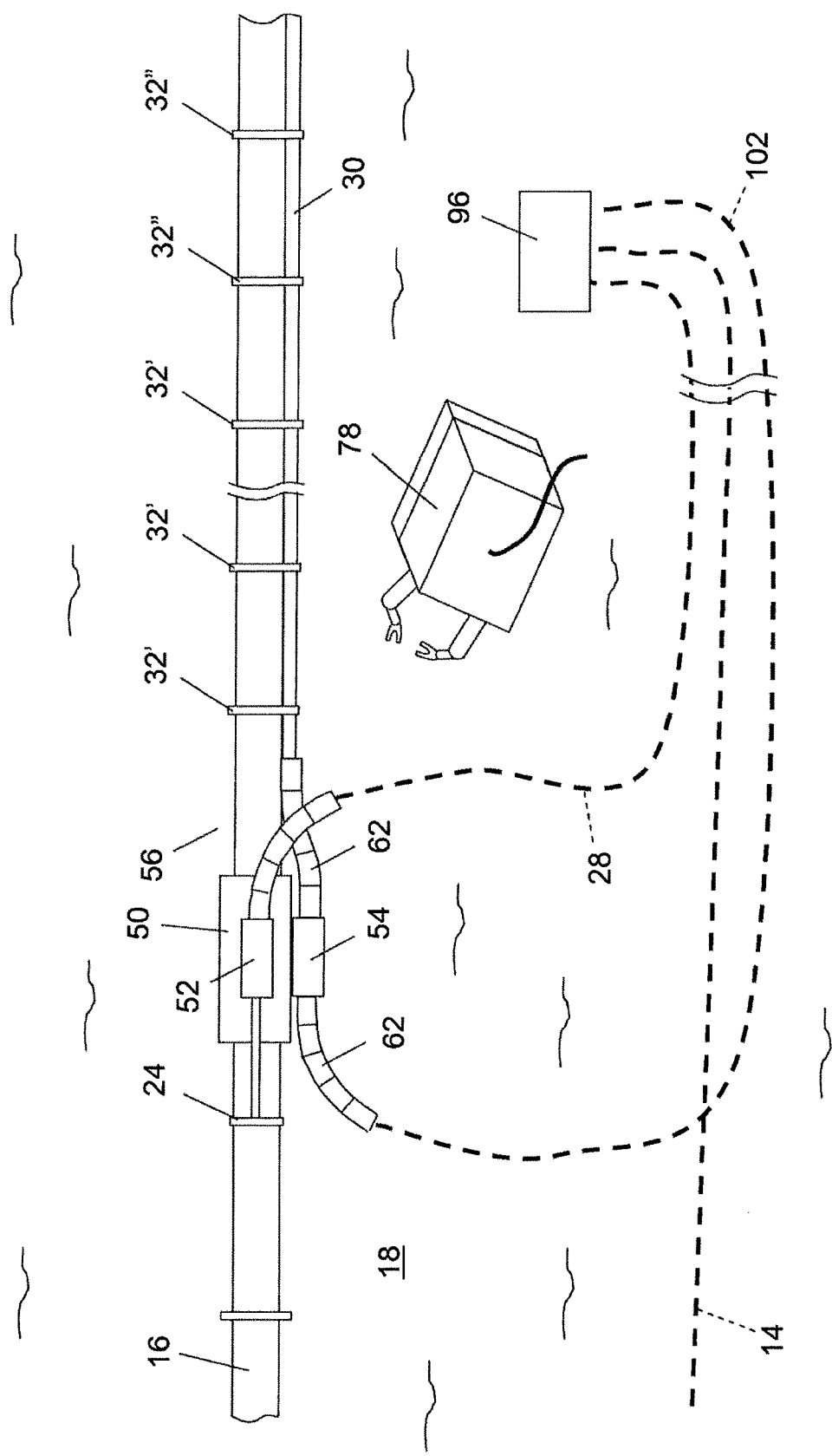
FIG. 12 is an enlarged schematic plan view of the near end region of the flowline assembly showing the connections between the DEH cable, the feeder cable and the umbilical riser via the subsea junction box.

FIGS. 11 and 12 show the free end portions of the umbilical riser 14, the feeder cable 28 and the DEH cable 30 (as extended here by a spliced feeder cable 102) joined by the junction box 96, all of which are lowered back to the seabed 18 beside the near end region of the flowline 16. In practice, the junction box 96 will be attached to a supporting structure on the seabed or landed on a foundation, but these have been omitted from the drawings for clarity. Again, the umbilical riser 14, the feeder cable 28 and the feeder cable 102 spliced to the DEH cable 30 lie generally parallel to each other over a length that exceeds the water depth.

The ROV 78 has reattached the DEH cable 30 to the flowline 16 in parallel piggybacked relation, either re-using the temporary fastenings 32' as described previously or using new fastenings 32. As the plan view of FIG. 12 shows, the ROV 78 has also reattached the armour block 54 of the DEH cable 30 to the anchor clamp 50 that surrounds the flowline 16, for example using bolts or other subsea-operable fixings.

Turning finally to FIGS. 13 to 15 of the drawings, these show another embodiment of the invention in which only the DEH cable 30 is piggybacked to the flowline 16 during launching from an installation vessel into the sea. Thus, the feeder cable 28 is electrically connected to the flowline 16 only after the flowline 16 has been landed on the seabed 18.

FIG. 13 shows the DEH cable 30 attached in parallel to the flowline 16 by temporary and permanent fastenings 32', 32". As before, the DEH cable 30 is also attached to the flowline 16 by an armour block 54 that is removably attached to an anchor clamp surrounding the flowline 16. Also, bend restrictors 62 adjoining the armour block 54 protect the DEH cable 30 as it bends relative to the armour block 54.

FIG. 14 shows an ROV 78 connecting the feeder cable 28 to the flowline 16 on the seabed 18. A pulling head 58 at the end of the feeder cable 28 is shown here supported by a lifting wire 80 hanging from a service vessel, which is not shown. The feeder cable 28 is electrically connected to the flowline 16 via a connection plate 24 and is anchored to the flowline 16 by an armour block 52 that is permanently attached to a modified anchor clamp 104. Conveniently, the anchor clamp 104 can be installed atop the flowline 16 irrespective of any twisting that the flowline 16 may experience about its central longitudinal axis during installation.

FIG. 14 also shows a free end portion of the DEH cable 30 in the process of being lifted away from the flowline 16 by a lifting wire 80 acting on its pulling head 60 as shown in FIG. 6.

The anchor clamp 104 is shown in FIG. 15 mounted on the flowline 16 and carrying the armour block 52 that surrounds the feeder cable 28. The anchor clamp 104 need not fully surround the flowline 16 but instead grips the flowline 16 between part-tubular jaws 106, 108 that are pivotably connected to each other along a pivot axis 110. The armour block 52 that surrounds the feeder cable 28 is held by a two-part bracket 112 attached to the jaw 106.

The jaw 106 comprises a curved part 114 on one side of the pivot 110 and a lever arm 116 on the other side of the pivot 110. A threaded rod 118 extends from a second pivot 120 on the jaw 108 toward the lever arm 116, where a free end of the rod 118 is retained by a pin 122 at the free end of the lever arm 114. A nut 124 in threaded engagement with the rod 118 can be advanced along the rod 118 to bear against the lever arm 116, which forces the jaws 106, 108 to close around and clamp against the flowline 16.

The broad concept of the invention may be applied to making electrical connections with other electrically-heated flowlines such as indirectly trace-heated flowlines.

Other variations are possible within the inventive concept. For example, an underwater vehicle other than an ROV may be employed for subsea operations, such as an autonomous underwater vehicle (AUV).

The invention claimed is:

1. A method of installing an electrically-heatable subsea flowline on a seabed at a depth beneath a water surface, the method comprising:

launching the flowline beneath the surface from a surface vessel with a first electric power cable attached to the flowline in piggybacked relation;

landing the flowline and the piggybacked first electric power cable on the seabed at said depth;

releasing a free end portion of the first electric power cable from the flowline on the seabed, that released free end portion having a length greater than said depth;

recovering a free end of the free end portion to the surface;

at the surface, electrically connecting the free end of the first electric power cable to a first electric power supply conductor;

lowering the connected first electric power cable and first electric power supply conductor beneath the surface; and reattaching the free end portion of the first electric power cable to the flowline on the seabed in piggybacked relation.

2. The method of claim 1, comprising leaving a fixed portion of the first electric power cable attached to the flowline in piggybacked relation while recovering the free end to the surface.

3. The method of claim 1, wherein, while the flowline is being launched and landed, the first electric power cable is held attached to the flowline by fastenings spaced along the flowline.

4. The method of claim 3, comprising removing the free end portion of the first electric power cable from fastenings that remain attached to the flowline.

5. The method of claim 4, comprising reattaching the free end portion of the first electric power cable to said fastenings.

6. The method of claim 3, wherein when removed from the flowline, the free end portion of the first electric power cable remains attached to fastenings that are removed from the flowline.

7. The method of claim 6, wherein the fastenings attached to the free end portion of the first electric power cable are reattached to the flowline.

8. The method of claim 3, wherein after connection to the first electric power supply conductor, the free end portion of the first electric power cable is reattached to the flowline with fastenings other than the fastenings that were used for its attachment to the flowline during launching and landing.

9. The method of claim 1, comprising electrically connecting a fixed end of the first electric power cable to the flowline before launching the flowline into the sea.

10. The method of claim 1, comprising laying the released free end portion of the first electric power cable on the seabed before recovering its free end to the surface.

11. The method of claim 10, comprising laying the first electric power supply conductor on the seabed before recovering a free end of the first electric power supply conductor to the surface.

12. The method of claim 11, comprising recovering the free ends of the first electric power cable and the first electric power supply conductor to the surface simultaneously.

13. The method of claim 1, comprising launching the flowline beneath the surface with a second electric power cable also attached to the flowline in piggybacked relation.

14. The method of claim 13, comprising electrically connecting the second electric power cable to the flowline before the flowline is launched into the sea.

15. The method of claim 13, comprising launching the flowline beneath the surface with a fixed portion of the second electric power cable permanently attached to an anchor clamp attached to the flowline.

16. The method of claim 13, comprising:
   releasing a free end portion of the second electric power cable from the flowline on the seabed, that released free end portion having a length greater than said depth;
   recovering a free end of the free end portion to the surface;
   at the surface, electrically connecting the free end of the second electric power cable to a second electric power supply conductor; and
   lowering the connected second electric power cable and second electric power supply conductor beneath the surface.

17. The method of claim 16, comprising laying the released free end portion of the second electric power cable on the seabed before recovering its free end to the surface.

18. The method of claim 17, comprising laying the second electric power supply conductor on the seabed before recovering a free end of the second electric power supply conductor to the surface.

19. The method of claim 18, comprising recovering the free ends of the second electric power cable and the second electric power supply conductor to the surface simultaneously.

20. The method of claim 16, wherein the first and second electric power supply conductors are contained in a common umbilical riser.

21. The method of claim 1, comprising releasing the free end portion of the first electric power cable from an anchor clamp attached to the flowline for recovery of the free end of the first electric power cable to the surface.

22. The method of claim 21, comprising reattaching the free end portion of the first electric power cable to the anchor clamp after lowering the connected first electric power cable and first electric power supply conductor beneath the surface.

23. The method of claim 1, comprising electrically connecting a second electric power cable to the flowline after the flowline is landed on the seabed.

24. The method of claim 23, comprising attaching an anchor clamp to the flowline on the seabed, the anchor clamp being attached to the second electric power cable.

25. The method of claim 1, wherein electrical connections made at the surface are made by splicing.

* * * * *